ated Aug. 13, 1957

2,802,736
POULTRY FEED

Robert W. Colby, Lake Jackson, Tex., and Robert J. Mesler, Jr., Midland, Mich., assignors to The Dow Chemical Company, Midland, Mich., a corporation of Delaware No Drawing. Application October 29, 1954,
Serial No. 465,734

4 Claims. (Cl. 99—4)

The invention is concerned with an improvement in poultry husbandry and is particularly directed to a novel poultry feed composition and a method for accelerating the growth of poultry.

According to the present invention, it has been discovered that the growth of poultry is accelerated by feeding the poultry a normal ration supplemented with small amounts of an (α-methylbenzyl)phenylphenol-ethylene oxide condensation product. The supplemented feed has been found particularly advantageous as a ration for young chickens. It is among the advantages of the invention that the weight gains resulting from the consumption of the supplemented feed are accompanied by increased feed efficiency; that is, the food is better utilized so that the consumption in pounds of feed per pound of weight gained by the fowl is lower than with unsupplemented feed.

The (α-methylbenzyl)phenylphenol-ethylene oxide condensation products effective in the present invention are those prepared by reacting an (α-methylbenzyl)phenylphenol with sufficient ethylene oxide to form a water-miscible product. In general, the ethylene oxide is employed in amount equivalent to from about 50 to 70 percent by weight of the finished condensation product. The condensation reaction may be carried out by conventional means as set forth, for example, in U. S. Patent 2,213,477. The condensation products are viscous liquids readily soluble in benzene and water and of relatively low solubility in aliphatic hydrocarbons. The (α-methylbenzyl)phenylphenols employed in these preparations are commercial products prepared by reacting ortho or meta phenylphenol with styrene.

The feed compositions of the invention may be prepared in any suitable fashion, provided that the (α-methylbenzyl)phenylphenol-ethylene oxide condensation product is intimately admixed with the poultry nutrients. For example, the condensation product is dissolved in a solvent and the resulting solution distributed over the feed while the latter is rolled or tumbled in a mixer. Alternatively, the condensation product is added during a mixing or milling step in the preparation of a pre-mixed feed. A convenient procedure is to prepare a concentrate by thoroughly admixing an aqueous solution of the condensation product with a portion of the feed and then blending the concentrate with the remainder of the feed. Such concentrates may contain from about 1 to 4 percent or more by weight of the condensation product.

In general, an effective amount of condensation product added to the feed is from about 0.01 to about 0.3 percent by weight of the total feed on an air-dry basis, preferably about 0.05 to about 0.1 percent by weight.

The following examples illustrate the invention but are not to be construed as limiting the same.

Example 1

An (α-methylbenzyl)phenylphenol-ethylene oxide condensation product is prepared by the reaction of 27.4 parts by weight of (α-methylbenzyl)phenylphenol with 52.8 parts by weight of ethylene oxide in the presence of about 0.2 part of sodium hydroxide as a catalyst. This condensation product is a viscous liquid, soluble in benzene, water and methanol, insoluble in heptane and having a specific gravity of 1.13 at 25° C. and a cloud point of 54.5° C. for a 10 percent aqueous solution thereof.

One part by weight of the above condensation product was dissolved in sufficient water to yield a solution of relatively low viscosity. This solution was added portion-wise to from 20 to 40 parts of a commercial mixed poultry feed while the latter was being agitated in a mechanical mixer to prepare a concentrate. Mixing was continued until a substantially uniform dispersion of the condensation product throughout the concentrate was obtained. The concentrate was then admixed in a large rotary mixer with sufficient of the mixed poultry feed to produce 1000 parts of supplemented feed composition containing 0.1 percent by weight of the condensation product. The commercial mixed feed employed above was considered a balanced normal feed ration and had the following composition:

| Ingredients: | Parts by weight |
|---|---|
| Ground yellow corn | 61.15 |
| Pulverized oats | 2.5 |
| Fish meal (60–70 percent protein) | 2.5 |
| A and D feeding oil | 0.3 |
| Iodized salt | 0.5 |
| Oyster shell flour | 0.5 |
| Steamed bone meal | 2.5 |
| Alfalfa meal | 2.0 |
| Soybean meal (44 percent protein) | 26.0 |
| DL-methionine | 0.05 |
| Vitamin and minor element concentrate | 2.0 |

The supplemented feed composition was fed ad libitum to a group of 40 mixed sex, day-old New Hampshire chicks. The chicks were kept in heated brooders until they reached four weeks of age and then transferred to unheated metal coops. The weights of the birds and total weight of feed consumed were determined when the birds were ten weeks old. As controls or checks, another group of 40 chicks from the same lot were similarly maintained and fed ad libitum with the balanced mixed feed composition without supplementation. In the ten week period the birds eating the supplemented feed attained a mean weight of 3.22 pounds per bird, while that of the controls was 3.09 pounds per bird. This weight amounted to a 4.2 percent increase over the mean weight of the control birds. The feed consumed per pound of gain was 3.7 percent less for the birds fed the supplemented composition than for the control birds fed the unmodified commercial feed. This corresponds to an increase of 3.7 percent in feed efficiency.

Example 2

0.5 part by weight of the condensation product of Example 1 was admixed with the commercial mixed feed as in the preceding example to prepare a supplemented feed composition containing 0.05 percent by weight of the condensation product. The latter composition was employed in feeding tests carried out as in Example 1 for a period of nine weeks. It was found that the feed efficiency for the chicks fed the supplemented composition increased 7.6 percent over the feed efficiency for the chicks on the unsupplemented diet.

We claim:
1. A poultry feed composition which comprises poultry nutrients and in intimate admixture therewith an (α-methylbenzyl)phenylphenol-ethylene oxide condensation product in amount sufficient to accelerate the growth of poultry fed therewith.

2. A composition according to claim 1 wherein the condensation product is employed in the amount of from about 0.01 to about 0.3 percent by weight.

3. In poultry husbandry, the method which comprises incorporating as a supplement in normal poultry feed for young chickens an (α-methylbenzyl)phenylphenol-ethylene oxide condensation product in an amount sufficient to accelerate the growth and improve the feed efficiency of poultry fed therewith.

4. A method according to claim 3 wherein the condensation product is employed in the amount of from about 0.01 to about 0.3 percent by weight based on the total weight of the supplemented feed composition.

References Cited in the file of this patent

UNITED STATES PATENTS

| | | |
|---|---|---|
| 2,340,063 | Lamb | Jan. 25, 1944 |
| 2,674,619 | Lundsted | Apr. 6, 1954 |
| 2,677,700 | Jackson et al. | May 4, 1954 |

OTHER REFERENCES

Science News Letter, March 15, 1952, page 164.